(12) United States Patent
Takemura

(10) Patent No.: US 8,788,668 B2
(45) Date of Patent: Jul. 22, 2014

(54) INFORMATION PROCESSING APPARATUS, INFORMATION PROCESSING SYSTEM, SETTING PROGRAM TRANSMISSION METHOD AND SERVER SETTING PROGRAM

(75) Inventor: Toshinori Takemura, Tokyo (JP)

(73) Assignee: NEC Corporation, Tokyo (JP)

( * ) Notice: Subject to any disclaimer, the term of this patent is extended or adjusted under 35 U.S.C. 154(b) by 89 days.

(21) Appl. No.: 12/918,831

(22) PCT Filed: Feb. 19, 2009

(86) PCT No.: PCT/JP2009/000696
§ 371 (c)(1),
(2), (4) Date: Aug. 23, 2010

(87) PCT Pub. No.: WO2009/104400
PCT Pub. Date: Aug. 27, 2009

(65) Prior Publication Data
US 2011/0004687 A1 Jan. 6, 2011

(30) Foreign Application Priority Data

Feb. 22, 2008 (JP) ................. 2008-041004

(51) Int. Cl.
*G06F 15/16* (2006.01)
*G06F 15/173* (2006.01)
(52) U.S. Cl.
USPC ........................... 709/226; 709/220; 709/223
(58) Field of Classification Search
USPC ......... 709/203, 220, 222–229, 243, 205, 227, 709/228, 238; 717/177; 718/1; 370/230; 707/782
See application file for complete search history.

(56) References Cited

U.S. PATENT DOCUMENTS 6,445,682 B1 * 9/2002 Weitz ............................ 370/257
7,941,510 B1 * 5/2011 Tormasov et al. ............ 709/220
(Continued)

FOREIGN PATENT DOCUMENTS

JP 2000-208912 A 1/2002
JP 2002024109 A 1/2002
(Continued)

OTHER PUBLICATIONS

International Search Report for PCT/JP2009/000696 mailed May 19, 2009.
(Continued)

*Primary Examiner* — Wing F Chan
*Assistant Examiner* — Rajeshwari Krishnan
(74) *Attorney, Agent, or Firm* — Sughrue Mion, PLLC

(57) ABSTRACT

A setting program apparatus, system, method and program are described. An input of a VA type and a VM identifier, specifying a VM to collaborate with a VA corresponding to the VA type, are received at a designation unit; a VA repository stores a VA type, a VA setting program and a VM setting program, such that the VA type, the VA setting program and the VM setting program are associated with each other; a setting program management unit obtains the VA setting program and the VM setting program, and specifies the VA based on the VA type; a setting program transmission unit transmits the obtained VM setting program and a VA identifier of the specified VA to the VM specified by the VM identifier received by the designation unit, and transmits the obtained VA setting program and the received VM identifier to the VA specified by the VA identifier.

7 Claims, 8 Drawing Sheets

(56) References Cited

U.S. PATENT DOCUMENTS

| | | | |
|---|---|---|---|
| 2005/0060349 A1* | 3/2005 | Shirin et al. | 707/104.1 |
| 2006/0184653 A1* | 8/2006 | van Riel | 709/222 |
| 2006/0218243 A1* | 9/2006 | Kudo et al. | 709/218 |
| 2007/0078988 A1* | 4/2007 | Miloushev et al. | 709/227 |
| 2007/0192769 A1* | 8/2007 | Mimura et al. | 719/316 |
| 2008/0288580 A1* | 11/2008 | Wang et al. | 709/203 |
| 2009/0276771 A1* | 11/2009 | Nickolov et al. | 717/177 |

FOREIGN PATENT DOCUMENTS

| | | |
|---|---|---|
| JP | 2003-316666 A | 11/2003 |
| JP | 2005-092880 A | 4/2005 |
| JP | 2005208999 A | 8/2005 |
| JP | 2005327237 A | 11/2005 |
| JP | 2005-246990 A | 11/2006 |
| JP | 2006-008860 A | 8/2007 |
| WO | 02078385 A | 10/2002 |
| WO | 2006-043320 A1 | 4/2006 |
| WO | 2006043320 A | 4/2006 |
| WO | 2006-080069 A1 | 8/2006 |

OTHER PUBLICATIONS

Office action in corresponding JP patent application 2009-554221, dated May 2, 2013.

* cited by examiner

INFORMATION PROCESSING APPARATUS, INFORMATION PROCESSING SYSTEM, SETTING PROGRAM TRANSMISSION METHOD AND SERVER SETTING PROGRAM

This patent application is the National Phase of PCT/JP2009/000696, filed Feb. 19, 2009, which claims priority from Japanese Patent Application No. 2008-041004 filed Feb. 22, 2008, the disclosure of which is hereby wholly incorporated by reference into this specification.

TECHNICAL FIELD

The present invention relates to an information processing apparatus, an information processing system, a setting program transmission method and a server setting program.

BACKGROUND ART

In recent years, a virtual server technology has been extending in which a plurality of virtual servers are constructed by software to execute a plurality of processes at the same time on one physical server. This virtual server technology also makes it possible to construct a system in which a plurality of virtual servers are operated at the same time on a plurality of physical servers connected by a communication network.

In this virtual server system with a plurality of virtual servers operated on a plurality of physical servers, a physical server for operating a virtual server is dynamically determined according to the load condition of the physical server. Normally, the network information such as the IP address of a virtual server is determined and set in the virtual server at the time of booting the virtual server. As in this case, a technique is known in which a device executing the information processing operation carries out the proper setting according to the place of execution thereof.

Patent Document 1, for example, describes a control system in which the setting information suitable for the type of a network selected is transmitted to a device connectable to a plurality of networks to make the device communicable with the particular network. In this control system, the setting information for all the connectable networks are collected into one setting data and dynamically transferred to each device, so that the setting information for a selected network is extracted from the setting data and set in the device.

[Patent Document 1] Japanese Patent Application. Laid-Open No. 2005-327237

DISCLOSURE OF THE INVENTION

The control system described in Patent Document 1 above is intended to operate each device independently but not set to operate a plurality of devices in collaboration with each other.

This invention has been achieved to solve the problem described above and an object thereof is to provide an information processing apparatus, an information processing system, a setting program transmission method and a server setting program in which each device is so set that a plurality of devices operate in collaboration with each other for an improved convenience.

According to this invention, there is provided an information processing apparatus including:

a management unit which accepts an input of at least first and second ones of server identifiers corresponding to one or at least two physical servers or one or at least two virtual servers operating on the physical servers; and a transmission unit which transmits, to a first server, a first setting program according to which the first server corresponding to the first server identifier accepted by the management unit collaborates with a second server corresponding to the second server identifier accepted by the management unit on the one hand, and transmits, to the second server, a second setting program according to which the second server collaborates with the first server on the other hand.

Also, according to this invention, there is provided an information processing system including:

a management unit which accepts an input of at least first and second ones of server identifiers corresponding to one or at least two physical servers or one or at least two virtual servers operating on the one or at least two physical servers; and a transmission unit which transmits, to a first server, a first setting program according to which the first server corresponding to the first server identifier accepted by the management unit collaborates with a second server corresponding to the second server identifier accepted by the management unit on the one hand, and transmits, to the second server, a second setting program according to which the second server collaborates with the first server.

Also, according to this invention, there is provided a setting program transmission method including:

a management step to accept an input of at least first and second ones of server identifiers corresponding to one or at least two physical servers or one or at least two virtual servers operating on the physical servers;

a first transmission step to transmit, to a first server, a first setting program according to which the first server corresponding to the first server identifier accepted in the management step collaborates with a second server corresponding to the second server identifier accepted in the management step; and a second transmission step to transmit, to the second server, a second setting program according to which the second server collaborates with the first server.

Also, according to this invention, there is provided a server setting program executed by an information processing terminal providing an information processing apparatus, including:

a management process to accept the input of at least first and second ones of server identifiers corresponding to one or at least two physical servers or one or at least two virtual servers operating on the physical servers;

a first transmission process to transmit, to a first server, a first setting program according to which the first server corresponding to the first server identifier accepted in the management process collaborates with a second server corresponding to the second server identifier accepted in the management process; and a second transmission process to transmit, to the second server, a second setting program according to which the second server collaborates with the first server.

Incidentally, an arbitrary combination of any of the component elements described above and the conversion of any expression according to the invention between any ones of the method, the apparatus, the system, the storage medium and the computer program are also effective as an embodiment of the invention.

According to this invention, there are provided an information processing apparatus, an information processing system, a setting program transmission method and a server setting program, in which each device can be set in such a manner that a plurality of the devices collaborate with each other for an improved convenience.

BRIEF DESCRIPTION OF THE DRAWINGS

The above and other objects, features and advantages will be made apparent by the detailed description of preferred embodiments below and the accompanying drawings.

BEST MODE FOR CARRYING OUT THE INVENTION

First Embodiment

Next, a virtual server system embodying this invention is described in detail with reference to the drawings.

Figure 1:
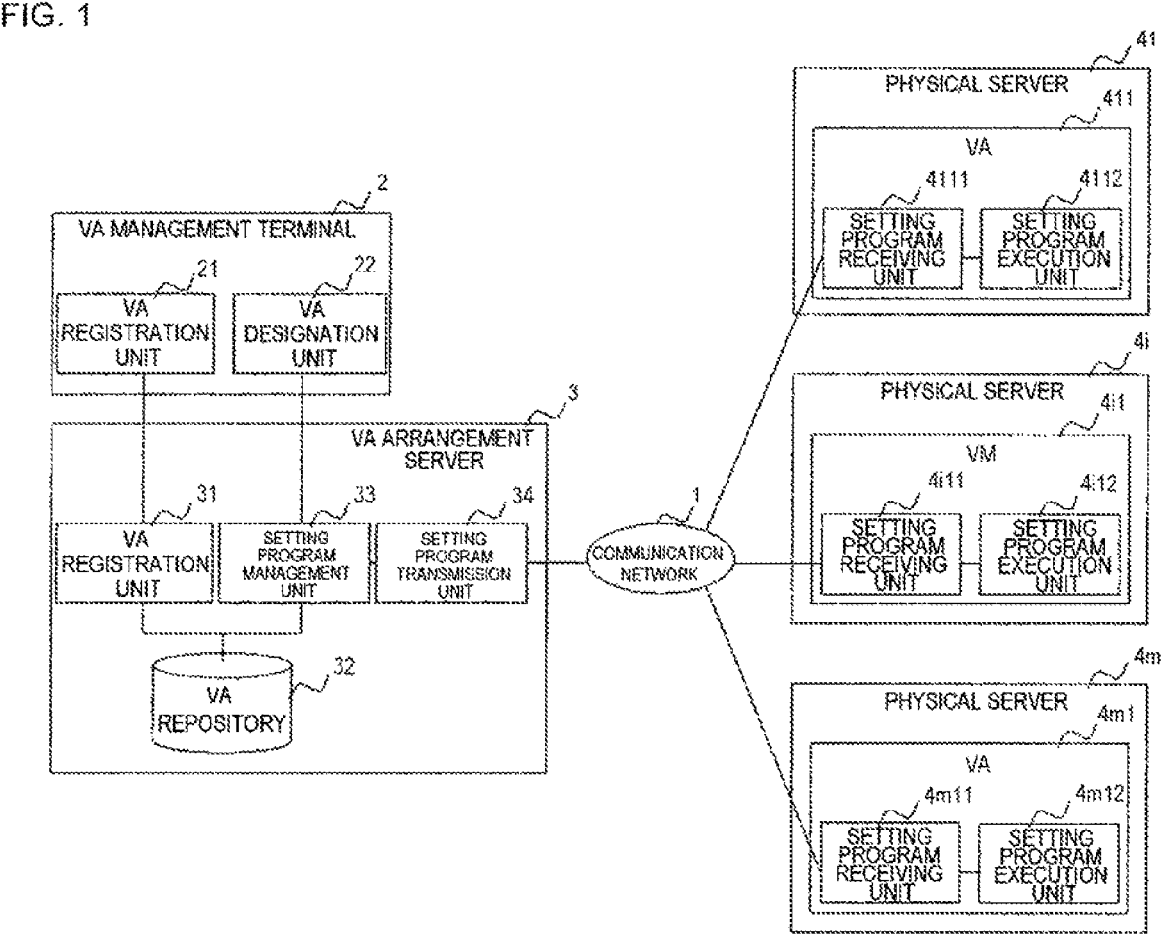
FIG. 1 is a block diagram showing the configuration of a virtual server system according to a first embodiment of the invention.

As shown in FIG. 1, a virtual server system according to a first embodiment includes a plurality of physical servers 41 to 4m (m: positive numeral), a VA arrangement server 3 for arranging each virtual server operating on the physical servers 41 to 4m, and a VA management terminal 2 for issuing a command to the VA arrangement server 3.

The term "VA" indicates a virtual appliance which is a virtual server constructed to execute specified information processing. Generally, VA is specialized for executing a specified information processing. As compared with an ordinary virtual server, therefore, the virtual appliance has a smaller room to change the setting thereof. The virtual server is defined as a computing environment in which one server computer is divided into a plurality of virtual computers, and a different OS (operating system) or application software is applied the operation of to a different computer.

The VA may be configured to execute one piece of information processing as a whole in collaboration with other virtual servers. The VA constituting a load balancer, for example, can realize the load distribution by controlling a plurality of virtual servers or physical servers. Also, the VA, like the VPN (virtual private network), can be configured to connect distant bases to each other and thus construct the whole spotted bases as one network. The collaboration between one server and another is defined as a function in which a plurality of physical servers or virtual servers operate in collaboration with one another for information transmission/reception or execution of the related process. Specifically, this function is achieved by the load balancer described above with a server to be controlled thereby or a network configuration of VPN servers.

Also, the arrangement of a virtual server is defined as the operation of permitting the physical servers 41 to 4m to function as a virtual server by causing the physical servers 41 to 4m to execute a predetermined program. The physical servers 41 to 4m may permit a plurality of virtual servers to function at the same time. Also, a part or the whole of the virtual servers caused to function by the physical servers may be the VA, or the VA and the virtual servers functioning at the same time.

The VA arrangement server 3 and the physical servers 41 to 4m are connected to each other through a communication network 1. Also, the VA management terminal 2 and the VA arrangement server 3 are connected to each other by some communication path. This communication path may be the communication network 1 or other communication systems such as USB (universal serial bus) or a serial interface. In FIG. 1, the virtual server operating on the physical server 41 is designated by reference numeral 411, and the virtual server operating on the physical server 4m by reference numeral 4m1 for identification.

The physical servers 41 to 4m are each implemented by, for example, a computer for executing a process according to a program stored in a computer-readable storage medium (magnetic disk, semiconductor memory, optical disk, and the like).

The virtual servers 411 to 4m1 operate on the physical servers 41 to 4m. The virtual server may hereinafter be referred to as the VM (virtual machine).

The VA is a VM which executes the information processing for a predetermined purpose. In FIG. 1, a description is given assuming that the servers 41 and 4m1 are both VA.

The VMs 411 to 4m1 include the setting program receiving units 4111 to 4m11 and the setting program execution units 4112 to 4m12, respectively.

The setting program receiving units 4111 to 4m11 receive a setting program (a VA setting program or a VM setting program) from the VA arrangement server 3, and deliver it to the setting program execution units 4112 to 4m12. The VA setting program and the VM setting program are described below.

The setting program execution units 4112 to 4m12 execute the setting program received.

The VMs 411 to 4m1 operate according to the setting.

As a result, the VA (first server) 411 and the VM (second server) 4i1 can collaborate with each other.

Next, the VA management terminal 2 is described.

The VA management terminal 2 includes a VA registration unit 21 and a VA designation unit 22. The VA management terminal 2 is implemented by, for example, a computer for executing a process according to a program stored in a computer-readable storage medium (magnetic disk, semiconductor memory, optical disk, and the like).

The VA registration unit 21 registers the VA image data, the VA setting program and the VM setting program collectively in the VA arrangement server 3. Specifically, the VA registration unit 21 stores, in the VA arrangement server 3, the information indicating the type of the VA, the VA image data, the VA setting program and the VM setting program in correspondence with each other.

The information indicating the type of the VA is, for example, a character string or a predetermined numerical value which can specify the VA type. The VA type may indicate the type of information processing executed by the VA, such as "load balancer" or "VPN server".

The VA image data includes, for example, a program. The physical servers 41 to 4m function as a VA to execute the information processing for a predetermined purpose by executing the program contained in the VA image data. The VA image data may include a default setting for information processing as a VA.

The VA setting program is used to carryout the setting required for the VA to execute the information processing for a predetermined purpose. The VA may execute the VA setting program, and change the setting to the one for collaboration with VM. For example, the VA as a load balancer is required to store the IP address of a VM to control the particular VM. In such a case, the VA may store the information on the IP address of the VM by executing the VA setting program. Incidentally, the IP address of the VM is a global IP address uniquely determined on the communication network 1.

The VM setting program carries out the setting as required by the VM to collaborate with the VA. The setting program execution unit included in each VM executes the VM setting program, and changes the VM setting. In order to collaborate with the VA as a load balancer, for example, the VM is required to store the information on the virtual IP address used by the VA. In such a case, the VM may store the information on the virtual IP address of the VA by executing the VM setting program. Incidentally, the virtual IP address of the VA is a global IP address determined uniquely on the communication network 1 and has the function of being recognized as one server virtually as viewed from outside.

The VA designation unit 22 designates the VA where the VM is to be registered. Specifically, the VA designation unit 22 receives, as an input from a person using the system such as an operation manager, the VA type and the information (VMID) by which the VM can be specified (for example, the first server identifier and the second server identifier). The VA designation unit 22 receives this input through, for example, a user interface. The VA designation unit 22 transmits the received VA type and VMID to the VA arrangement server 3.

Next, the VA arrangement server 3 is described.

The VA arrangement server 3 includes, as component elements, a setting program management unit (management unit) 33 for accepting the input of the information (first server identifier) indicating at least the VA type and the VMID (second server identifier) among the server identifiers corresponding to one or at least two physical servers or one or at least two virtual servers operating on the physical servers, and a setting program transmission unit (transmission unit) 34 which transmits, to the VA 411, the VA setting program (first setting program) according to which the VA (first server) 411 corresponding to the information indicating the VA type accepted by the setting program management unit 33 collaborates with the VM (second server) 4i1 corresponding to the VMID accepted by the setting program management unit 33 on the one hand, and which transmits to the VM 4i1 the VM setting program (second setting program) according to which the VM 4i1 collaborates with the VA 411 on the other hand.

Also, the VA arrangement server 3 includes a VA registration unit 31 and a VA repository (storage unit) 32.

The VA arrangement server 3 is a computer having, for example, a memory and a CPU (central processing unit) implemented by a semiconductor integrated circuit. The VA arrangement server 3 arranges a program on a memory by reading it from a computer-readable storage medium, downloading it from a network or otherwise, and the CPU executes the program on the memory. In this way, the VA arrangement server 3 may implement the VA registration unit 31, the VA repository 32, the setting program management unit 33 and the setting program transmission unit 34.

The VA registration unit 31 delivers the information indicating the VA type from the VA management terminal 2, the VA image data, the VA setting program and the VM setting program to the VA repository 32 in correspondence with each other.

The VA repository 32 stores therein the information indicating the VA type from the VA registration unit 31, the VA image data, the VA setting program and the VM setting program in correspondence with each other.

The setting program management unit 33 receives the VMID and the information indicating the VA type delivered thereto from the VA management terminal 2. The setting program management unit 33 acquires, from the VA repository 32, the VA setting program corresponding to the VA type received and the VM setting program. The setting program management unit 33 delivers the VA setting program, VMID and the VM setting program to the setting program transmission unit 34.

The setting program transmission unit 34 transfers the VA setting program and the VM setting program received from the setting program management unit 33 to the VA and the VM that can be specified by the VMID.

Specifically, the VA arrangement server 3 further includes the VA repository 32 for storing, in a form correlated to each other, at least the information indicating the VA type, the VA setting program and the VM setting program. The setting program management unit 33, upon acceptance of the input of the information indicating the VA type and VMID, reads the VA setting program from the VA repository 32 and the VM setting program based on the accepted information indicating the VA type. The setting program transmission unit 34 transmits the VA setting program read from the VA repository 32 to the VA 411, and the VM setting program read from the VA repository 32 to the VM 4i1.

Next, the operation of the first embodiment is described.

The virtual server system according to the first embodiment, in order to permit a booted VM to collaborate with a designated VA, transfers the VA setting program (first setting program) or the VM setting program (second setting program) dynamically to the VA (first server) or the VM (second server), respectively and executes them.

Figure 2:
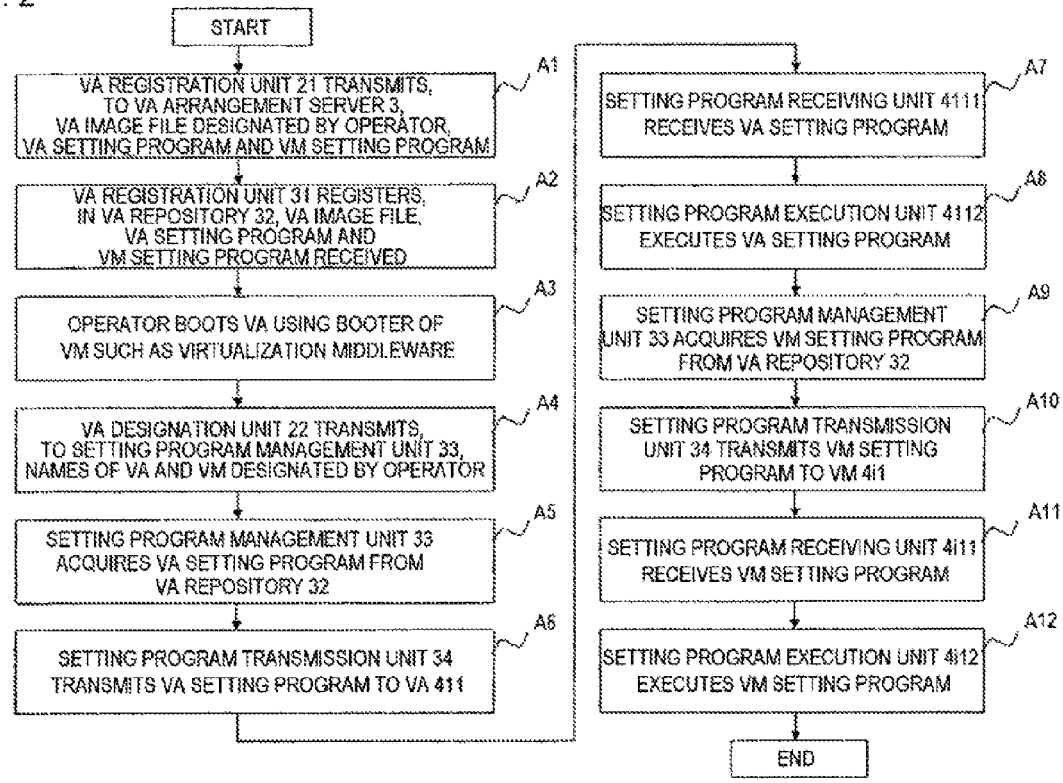
FIG. 2 is a flowchart showing the operation of a virtual server system according to the first embodiment of the invention.

FIG. 2 is an example of a flowchart showing the processing steps of the VA arrangement server included in the virtual server system shown in FIG. 1. These processing steps include at least two steps, i.e. a registration step and the setting step.

[Registration Step]

First, the operator designates the VA type to be registered in the VA management terminal 2. The VA registration unit 21 of the VA management terminal 2 transmits the information indicating the designated VA type, the designated VA image data, the VA setting program and the VM setting program to the VA arrangement server 3 (step A1). The VA registration unit 31 of the VA arrangement server 3 registers the information indicating the VA type, the VA image data, the VA setting program and the VM setting program in the VA repository 32 (step A2).

The VA thus registered is booted on the physical servers 41 to 4m using the normal VM booting unit provided by virtualization middleware, or the like.

By way of description, the VA image data may contain a program causing the physical server to function as a load balancer. Assume that the VA 411 is booted on the physical server 41 as the result of execution of this program by the physical server 41. In this way, the VA 411 corresponding to the information indicating the VA type can operate on the physical server 41. Then, the VA 411, by executing the program to be managed as a VM in any one of the physical servers, can collaborate with the particular VM. Also, the VA image data may contain a program permitting the physical server to function as a VPN server. Then, assume that the VA 4m1 for carrying out the information processing as a VPN server is booted on the physical server 4m. Further, assume that the VM 4i1 is booted on the physical server 4i (step A3).

[Setting Step]

Next, the operator issues a command at the VA management terminal 2 to permit the booted VM 4i1 to collaborate with the VA 411. The VA designation unit 22 of the VA management terminal 2 specifies the VA and VM for collaboration from the information indicating the VA type and the VM name input by the operator. Then, the VA designation unit 22 delivers, to the setting program management unit 33, the information (first server identifier) adapted to specify the VA and the information (second server identifier) adapted to specify the VM (step A4).

The setting program management unit 33, upon detection of a plurality of VAs having the same VA type, for example, may specify one of them at random, may specify a VA having the smallest load according to the load information, or may specify a VA operating on the physical server having the most satisfactory specification as a physical server which functions as a VA. Also, the VA designation unit 22 may use the information specifying the VA uniquely in place of the information indicating the VA type.

The description is continued on the assumption that the VA 411 is specified as a VA. The setting program management unit 33 acquires the VA setting program for the specified VA from the VA repository 32, and delivers it to the setting program transmission unit 34 (step A5). In the process, the setting program management unit 33 delivers, to the setting program transmission unit 34, also the IP address specifying the VM 4i1 uniquely on the communication network 1. The setting program transmission unit 34 transfers the VA setting program and the IP address uniquely specifying the VM 4i1 to the VA 411 (step A6).

The setting program receiving unit 4111 of the VA 411 receives the VA setting program and the IP address uniquely specifying the VM 4i1 and delivers them to the setting program execution unit 4112 (step A7). The setting program execution unit 4112 executes the VA setting program while at the same time registering the IP address of the VM 4i1 thereby to complete the setting process on a VA side (step A8).

Next, in order to execute the setting process on a VM side, the setting program management unit 33 on the VA arrangement server 3 acquires the VM setting program of a specified VA from the VA repository 32, and delivers it to the setting program transmission unit 34 (step A9). In the process, the setting program management unit 33 delivers, to the setting program transmission unit 34, also the virtual IP address for uniquely specifying the VA 411 on the communication network 1. The setting program transmission unit 34 transfers the VM setting program and the virtual IP address specifying the VA 411 uniquely to the VM 4i1 (step A10).

The setting program receiving unit 4i11 of the VM 4i1 receives the VM setting program and the virtual IP address uniquely specifying the VA 411, and delivers them to the setting program execution unit 4i12 (step A11). The setting program execution unit 4i12 executes the VM setting program while at the same time registering the virtual IP address of the VA 411 thereby to complete the setting process on the VM side (step A12).

According to the first embodiment, the setting required for the VM to collaborate with the VA is accomplished by executing the VM setting program. Also, the VM and the VA each hold the IP address specified uniquely, and therefore, can be connected mutually for collaboration. Also, the VM setting program is dynamically transferred from the VA arrangement server 3, and therefore, the VM 4i1 is not required to prepare all the setting programs in advance, so that the required setting can be carried out when required.

As described above, according to the first embodiment, the VA setting program and the VM setting program are transferred and executed sequentially, and therefore, the dynamic setting is possible by collaboration among a plurality of servers.

Now, an embodiment of the invention is compared with Patent Document 1 providing the related art.

In the control system described in Patent Document 1, the setting data including the setting information is required to be collected for each device, and therefore, a particular network to which a particular device is connectable is required to be known in advance. In the virtual server system in the first embodiment described above, in contrast, the setting is required not only for connection to a predetermined device but also for collaboration with another virtual server not yet determined.

A load balancer for distributing accesses from a great amount of Web browsers to a plurality of Web servers is an example. A list of the IP addresses of the Web servers as access distributes is required to be registered beforehand in the virtual server providing the function of the load balancer. In the dedicated load balancer, the operator normally carries out this setting manually. In the case where the physical server to be booted or the network is dynamically determined as in a virtual server, however, the setting is required to be changed with each movement, addition or deletion of the Web server.

Also, the number of the Web servers is increased dynamically by scale-out corresponding to the load. In the case where the load distribution is not considered in advance, however, a situation may occur in which the setting is not carried out for a load distribution server required on the part of the Web server. Also, in the case where an attempt is made to associate the Web server with a VPN group at another timing, the VPN setting not considered in advance may be required.

As described above, in a virtual server system in which a plurality of virtual servers operate on a plurality of physical servers, the problem is that the setting data cannot be prepared in advance by collecting all the setting information for each virtual server. Another problem is that although the setting in a virtual server or another virtual server operating in collaboration with therewith is required at the starting point of or during the execution, the prior art poses the problem that the dynamic setting cannot be carried out in collaboration among a plurality of virtual servers.

To cope with these problems, according to an embodiment of the invention, the setting required for the VM to collaborate with the VA is carried out by executing the VM setting program. The VM setting program is dynamically transferred from the VA arrangement server. Therefore, the VM is not required to have all the setting programs in advance, and the required setting can be accomplished whenever required.

Second Embodiment

Next, a second embodiment of the invention is described in detail with reference to the drawings.

Figure 3:
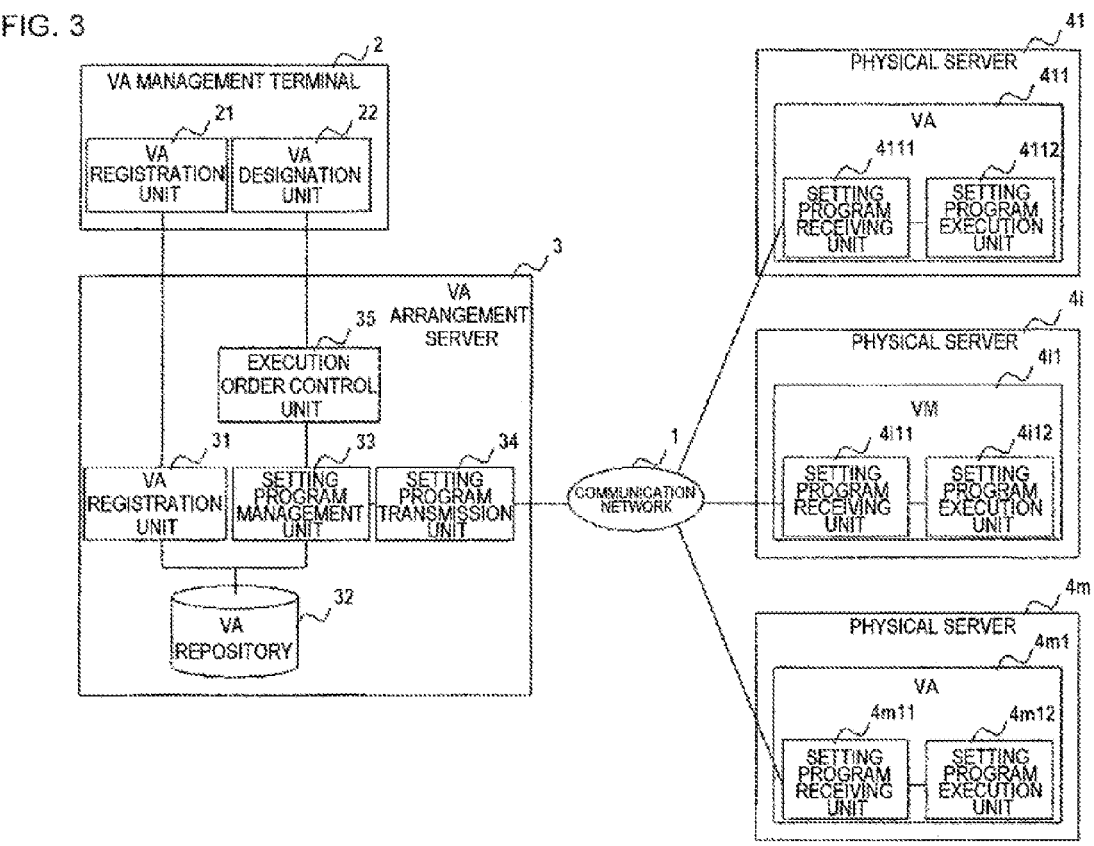
FIG. 3 is a block diagram showing the configuration of a virtual server system according to a second embodiment of the invention.

Referring to FIG. 3, the second embodiment of the invention is different from the first embodiment in that according to the second embodiment, the VA arrangement server 3 has an execution order control unit 35 in addition to the configuration of the VA arrangement server 3 of the first embodiment shown in FIG. 1.

According to the second embodiment, in addition to the information indicating the VA type, the VA image data, the VA setting program and the VM setting program, the VA registration unit 21 stores the execution order information in correspondence therewith in the VA arrangement server 3.

The execution order information indicates the order in which the VA setting program or the VM setting program is executed by the VA or the VM. The execution order information includes the information, for example, indicating that the VM setting program is executed by the VM upon complete of execution of the VA setting program by the VA. The execution order information may be more complicated. For example, the VA setting program and the VM setting program are divided into n (n: integer not less than one) steps including first to nth steps and m steps (m: integer not less than one) including first to mth steps, respectively, and the execution order information may include the information that upon complete of execution up to the ith (i: not less than one but not more than n) step of the VA setting program by the VA, the VM executes the jth (j: not less than one but not more than m) step of the VM setting program by the VM. This is an example of the execution order information, to which the invention is not limited.

According to the second embodiment, the VA repository 32 stores the information indicating the VA type, the VA image data, the VA setting program, the VM setting program and the execution order information in correspondence with each other.

The execution order control unit 35 controls the VA setting program and the VM setting program to be executed in the order designated at the time of VA registration. This execution order control unit 35 can designate not only the order in which the VM setting program is executed after execution of the VA setting program but also a more complicated order of program execution according to the execution order information designated at the time of registration.

Specifically, the VA arrangement server 3 according to the second embodiment further includes the execution order control unit 35 for controlling a timing at which the VA 411 executes the VA setting program and a timing at which the VM 4i1 executes the VM setting program, wherein the VA repository 32 stores the order information indicating the order in which the VA setting program is executed by the VA 411 and the VM setting program is executed by the VM 4i1. The setting program management unit 33 reads the order information stored in the VA repository 32, and the execution order control unit 35 causes the VA setting program and the VM setting program to be executed based on the order of execution indicated in the order information read from the VA repository 32.

Next, the operation of this embodiment is described in detail with reference to the drawings.

Figure 4:
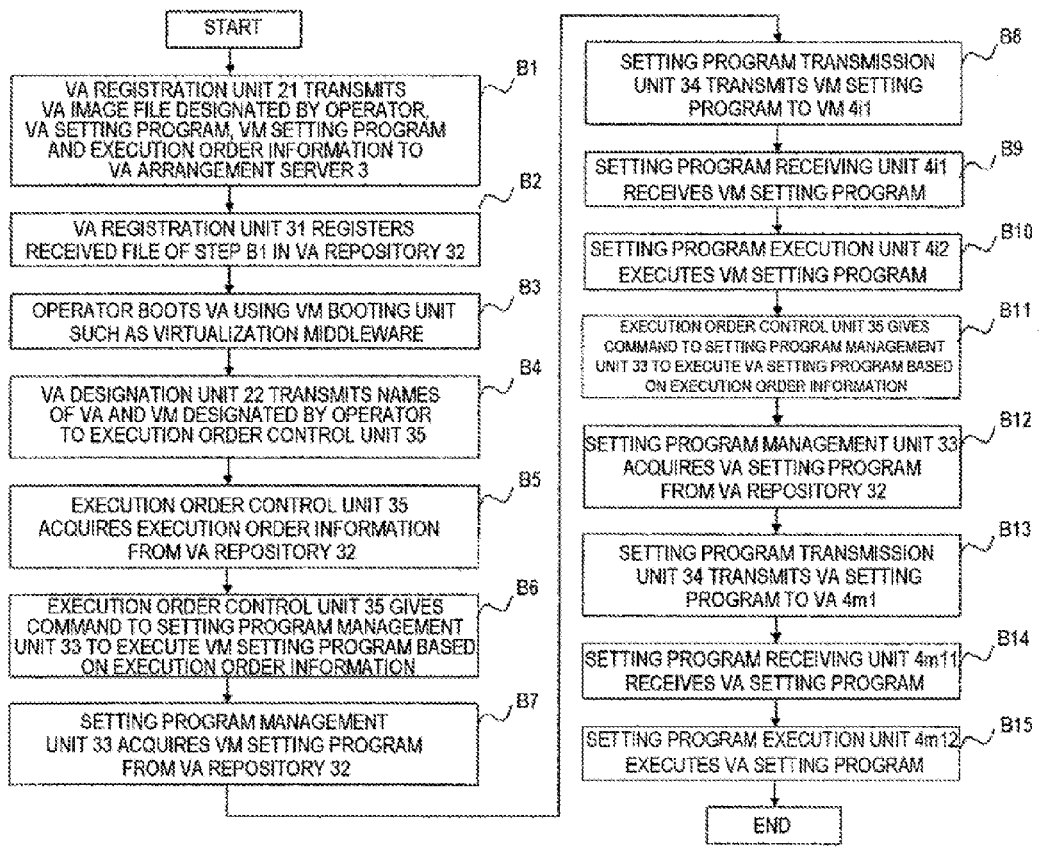
FIG. 4 is a flowchart showing the operation of a virtual server system according to the second embodiment of the invention.

FIG. 4 is a flowchart showing the processing steps for the VA arrangement server of the virtual server system shown in FIG. 3 according to the second embodiment.

The second embodiment shows a case in which in addition to the VA image data, the VA setting program and the VM setting program, the execution order information is registered at the time of VA registration, so that the order in which the setting program is executed can be designated flexibly for each VA.

[Registration Step in Second Embodiment]

As shown in FIG. 4, the operator designates the VA to be registered at the VA management terminal 2. The VA registration unit 21 of the VA management terminal 2, in addition to the designated VA image data, the VA setting program and VM setting program, transmits the execution order information to the VA arrangement server 3 (step B1). The VA registration unit 31 of the VA arrangement server 3 registers in the VA repository 32, the received VA image data, the VA setting program, the VM setting program and the execution order information that have thus been received (step B2).

The VA thus registered is booted on the physical servers 41 to 4m using the normal VA booting means provided by the virtualization middleware, for example. In the case under consideration, assume that the VA 411 of the load balancer is booted on the physical server 41 and the VA 4m1 VPN is booted on the physical server 4m (step B3). Also, assume that the VM 4i1 is booted on the physical server 4i (step B3).

[Setting Step in Second Embodiment]

The operator inputs a command at the VA management terminal 2 for collaboration between the VM 4i1 and the VA 411 booted. The VA designation unit 22 of the VA management terminal 2 delivers the names of the VA and the VM designated by the operator to the execution order control unit 35 (step B4). The execution order control unit 35 acquires the execution order information from the VA repository 32 through the setting program management unit 33 (step B5). The execution order control unit 35 executes the setting program according to the execution order information. Assume that the execution of the VM setting program and the VA setting program in that order is designated as the execution order information. The execution order control unit 35 gives a command to the setting program management unit 33 to execute the VM setting program (step B6). The setting program management unit 33 acquires the VM setting program of the designated VM from the VA repository 32 and delivers it to the setting program transmission unit 34 (step B7). The setting program transmission unit 34 transfers the VM setting program to the VM 4i1 (step B8).

The setting program receiving unit 4i11 of the VM 4i1 receives the VM setting program and delivers it to the setting program execution unit 4i12 (step B9). The setting program execution unit 4i 12 executes the VM setting program and thus completes the setting process on the VM side (step B10). Then, the setting program execution unit 4i12 notifies the execution order control unit 35 on the VA arrangement server 3 that the setting process on the VM side is completed.

Next, the execution order control unit 35 on the VA arrangement server 3 executes the VA setting program according to the execution order information. The execution order control unit 35 gives a command to the setting program management unit 33 to execute the VA setting program (step B11). In order to execute the setting process on the VA side, the setting program management unit 33 acquires the VA setting program for the designated VA from the VA repository 32, and delivers it to the setting program transmission unit 34 (step B12). The setting program transmission unit 34 transfers the VA setting program to the VA 4m1 (step B13).

The setting program receiving unit 4m11 of the VA 4m1 receives the VA setting program and delivers it to the setting program execution unit 4m12 (step B14). The setting program execution unit 4m12 executes the VA setting program and thus completes the setting process on the VA side (step B15).

According to the second embodiment, the order in which the setting programs are executed can be determined according to the execution order information. In the example described above, the VA setting program is executed after the VM setting program. Nevertheless, the VM setting program may be executed again followed by the entire process. Such a flexible control operation can be performed, with the result that the automatic arrangement is made possible even in the case where the VA arrangement process is complicated.

Third Embodiment

Next, a third embodiment of the invention is described in detail with reference to the drawings.

Figure 5:
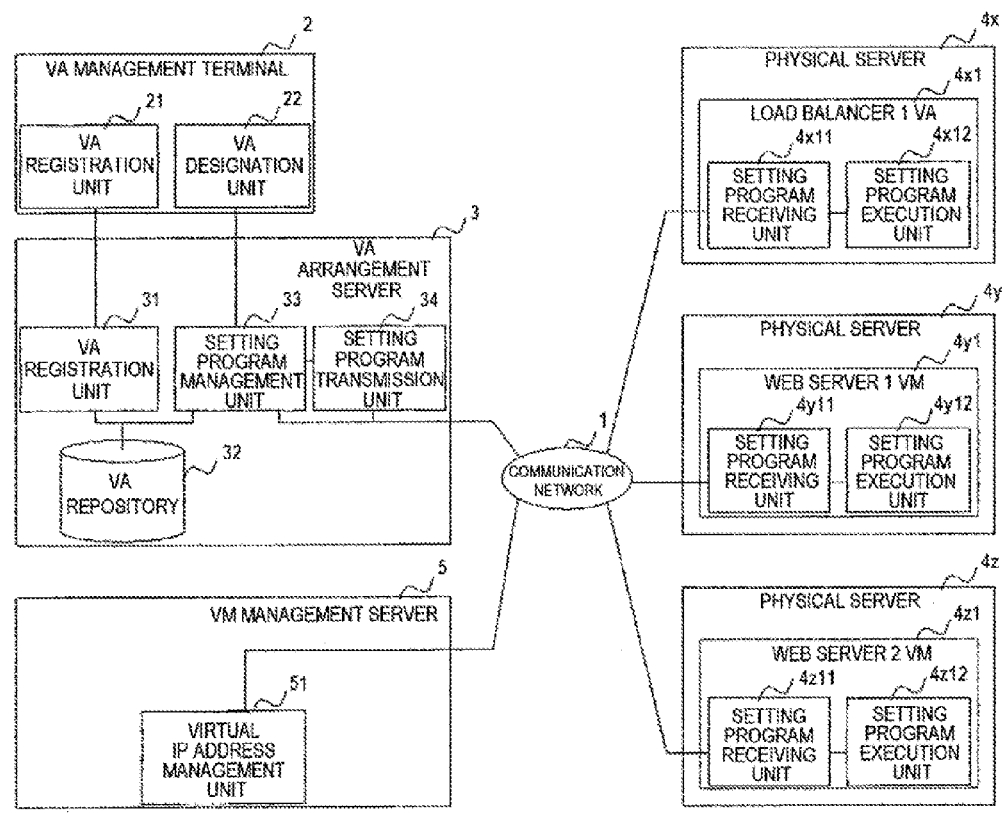
FIG. 5 is a block diagram showing the configuration of a virtual server system according to a third embodiment of the invention.

Referring to FIG. 5, the third embodiment of the invention is different from the first embodiment shown in FIG. 1 in that according to the third embodiment, in addition to the configuration of the VA arrangement server 3 of the first embodiment, the setting program management server 33 can communicate with other information processing apparatuses through the communication network 1. Another difference lies in the addition of a VM management server 5. In the third embodiment, the component elements similar to those of the first embodiment are designated by the same reference numerals, respectively, and the description will not be repeated.

The VM management server 5 is for managing the operation of starting and stopping the VM and the VA, and includes a virtual IP address management unit 51.

The virtual IP address management unit 51 holds a set of data including the name of the booted VA and the virtual IP address of the VA.

Specifically, the communication network 1 further includes an allocation unit for allocating (newly attach) a virtual IP address (identification information) to VA $4x1$. The allocation unit allocates the virtual IP address to the VA $4x1$ at a predetermined timing.

As described above, the third embodiment includes the VM management server 5 as an allocation unit. This VM management server 5 monitors, for example, the VA $4x1$, the VM $4y1$ and the VM $4z1$ connected to the communication network 1, and as long as these units function as a virtual server, allocates the virtual IP address, while the virtual IP address is canceled when the function stops. As an alternative, the VM management server 5 may allocate the virtual IP address when changing the contents of the process executed by the VA. Also, in the VM management server 5, the virtual IP address allocated to the VA may not be limited to one fixed value, but a plurality of arbitrary virtual IP addresses may be secured and allocated in such a manner that they are recognized as a single virtual IP address as viewed from outside.

As a result, the VM management server 5 can attach a new virtual IP address to the VA $4x1$.

Next, the operation of this embodiment is described in detail with reference to the drawings.

Figure 6:
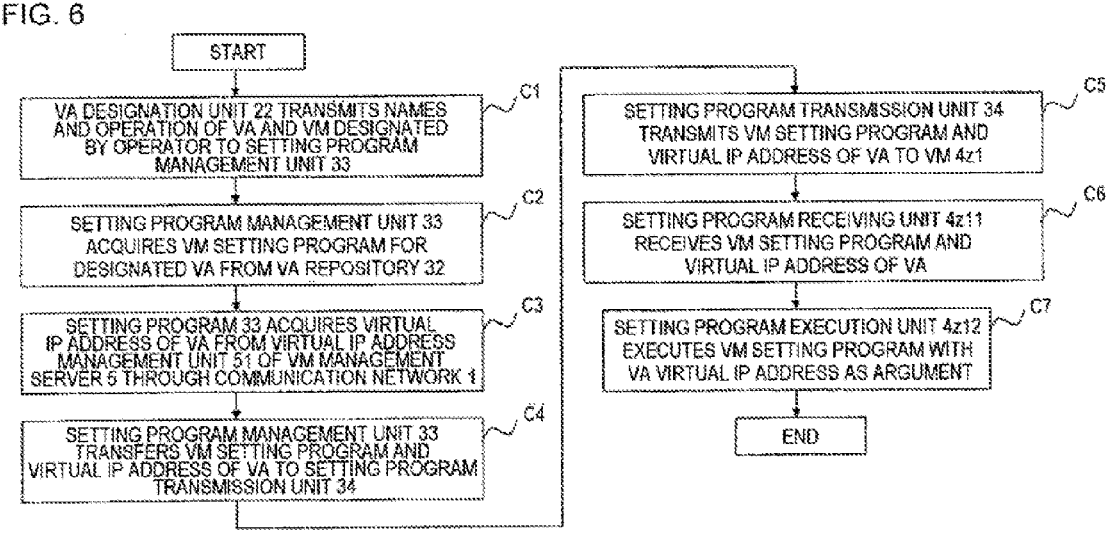
FIG. 6 is a flowchart showing the operation of a virtual server system according to the third embodiment of the invention.

FIG. 6 is a flowchart showing the processing steps of the VA arrangement server according to the third embodiment included in the virtual server system shown in FIG. 5.

The third embodiment shows an example in which the VM having the function as an Web server is newly added to the VA having the load balancer function, as an object to be managed by the VA.

Figure 7:
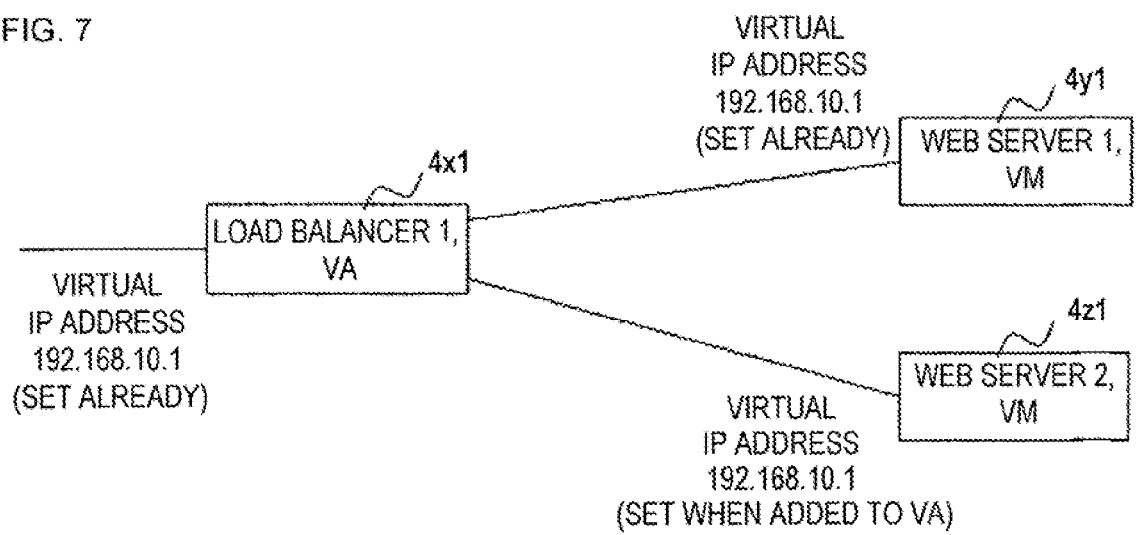
FIG. 7 is a diagram showing the configuration of a load balancer according to the third embodiment of the invention.

The load balancer VA (named the load balancer 1), as shown in FIG. 7, has two Web server VMs (named the Web servers 1 and the Web server 2 corresponding to the VM $4y1$ and the VM $4z1$, respectively) as an object of management. By distributing the requests to these Web servers, the load is distributed. In the case under consideration, assume that the VM of the Web server 1 already exists as an object of management in addition to the VA of the load balancer 1, and the VM of the Web server 2 is added as another object of management.

Figure 8:
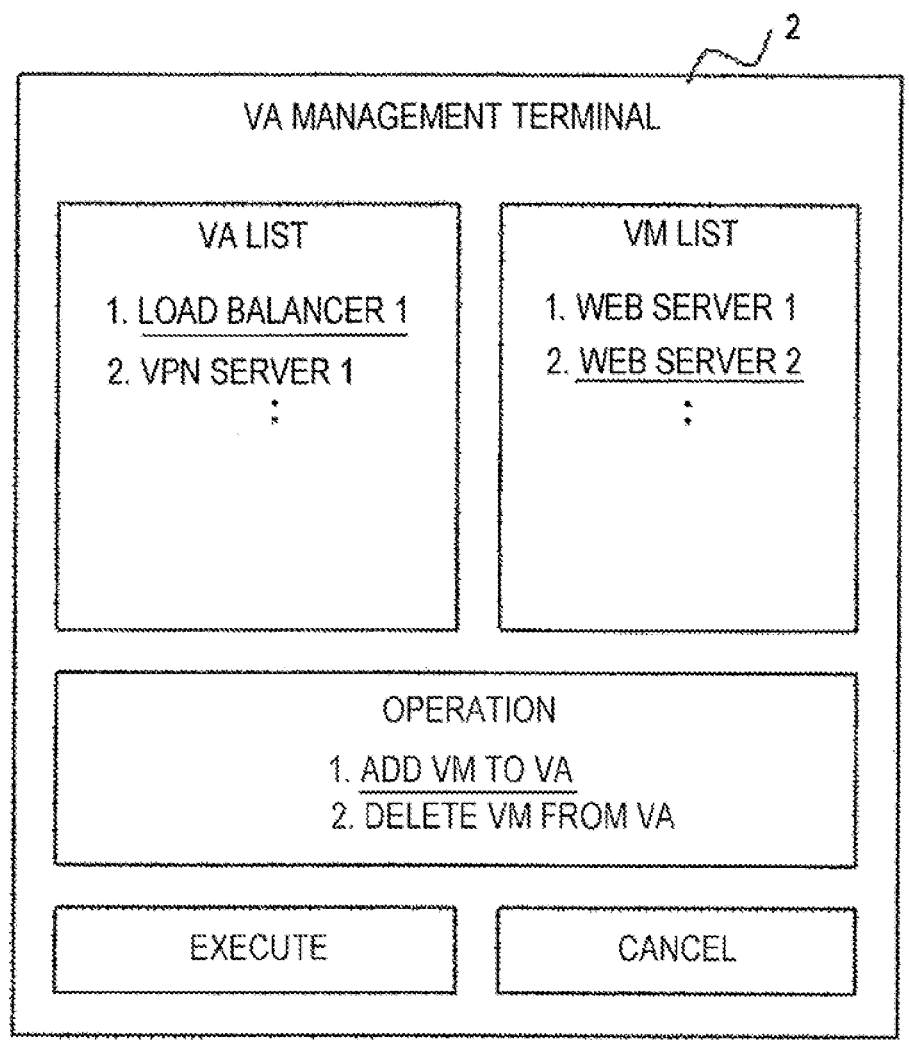
FIG. 8 is a diagram showing an example of the GUI of a VA management terminal according to the third embodiment of the invention.

As shown in FIG. 6, the operator inputs a command to the VA management terminal 2 for collaboration between the VM $4z1$ and the VA $4x1$ of the booted Web server 2. The VA designation unit 22 of the VA management terminal 2 may have a GUI (graphical user interface) such as shown in FIG. 8. In the GUI shown in FIG. 8, an area for selection of the VA list, the VM list and the operation exists on the VA management terminal 2. The operator, by selecting "load balancer 1" on the VA list, "Web server 2" on the VM list and "add VM to VA" of the operation and depressing "EXECUTE (ENTER)" button, can give a command to register the VM $4z1$ of the Web server 2 in the VA $4x1$. The VA designation unit 22 of the VA management terminal 2 delivers the names of the VA and the VM designated by the operator and the operation selected to the setting program management unit 33 (step C1).

The setting program management unit 33 acquires, from the VA repository 32, the VM setting program corresponding to the designated VA (step C2). The setting program management unit 33 delivers the load balancer 1 as the VA name to the virtual IP address management unit 51 of the VM management server 5 through the communication network 1 and thus acquires the virtual IP address of the VA (step C3). The setting program management unit 33 delivers the VM setting program and the virtual IP address of the VA to the setting program transmission unit 34 (step C4). The setting program transmission unit 34 transfers the VM setting program and the virtual IP address of the VA to the VM $4z1$ of the Web server 2 (step C5).

The setting program receiving unit $4z11$ of the VM $4z1$ of the Web server 2 receives the VM setting program and the virtual IP address of the VA, and delivers them to the setting program execution unit $4z12$ (step C6). The setting program execution unit $4z12$ executes the VM setting program with the virtual IP address of the VA as an argument and thus completes the setting process on the VM side of the Web server 2 (step C7).

According to the third embodiment, the VM $4z1$ of the Web server 2 can be added as an object of management by the VA $4x1$ of the load balancer 1. In the case described above, the VM $4z1$ is added as an object of management by the booted VA $4x1$. By combining the control operation based on the execution order information according to the second embodiment, however, the new booting of the VA and the addition of the VM can be collectively carried out. As a result, the automatic arrangement of the VA of the load balancer is made possible.

Each embodiment described above shows an example of only one aspect of the invention, and this invention is not limited to the first to third embodiments described above. It will be understood by those skilled in the art that the configuration and the detailed aspects of the invention can be modified variously without departing from the spirit and scope of the invention.

The setting program transmission method according to this embodiment includes, for example, a management step for accepting the input of at least the information for identifying the VA and the VMID (first and second server identifiers) among those server identifiers corresponding to one or at least two physical servers or one or at least two virtual servers operating on the one and at least the two physical servers, a first transmission step for transmitting, to the VA 411, the VA setting program according to which the VA 411 corresponding to the information for identifying the VA accepted in the management step collaborates with the VM $4i1$ corresponding to the VMID accepted in the management step, and a second transmission step for transmitting, to the VM $4i1$, the VM setting program according to which the VM $4i1$ collaborates with the VA 411.

Also, the server setting program according to this embodiment, which is executed by the VA arrangement server 3, causes the VA arrangement server 3 to execute a management step for accepting the input of at least the information for identifying the VA and the VMID (first and second server identifiers) among the server identifiers corresponding to one or at least two physical servers or one or at least two virtual servers operating on the one or at least two physical servers, a first transmission step for transmitting, to the VA 411, the VA setting program according to which the VA 411 corresponding to the information for identifying the VA accepted in the management step collaborates with the VM 4i1 corresponding to the VMID accepted in the management step, and a second transmission step for transmitting, to the VM 4i1, the VM setting program according to which the VM 4i1 collaborates with the VA 411.

The invention may be embodied otherwise as described below.

First Example

There is provided an arrangement unit which transmits a setting program to a part or the whole of at least one physical server capable of operating one or both of a virtual appliance realizing a predetermined function and a virtual server collaborating with the virtual appliance. This arrangement unit is supplied as an input with a virtual appliance type identifier capable of identifying the type of the virtual appliance and a virtual server identifier capable of identifying the virtual server collaborating with the virtual appliance. By this arrangement unit, a virtual appliance setting program for setting the collaboration with a virtual server identifiable by the virtual server identifier is transmitted to a virtual appliance functioning as the result of execution, by the physical server, of the program causing the physical server to function as a virtual appliance identifiable by the virtual appliance type identifier on the one hand, and a virtual server setting program for setting the collaboration with a virtual appliance identifiable by the virtual appliance type identifier is transmitted to a virtual server identifiable by the virtual server identifier on the other hand.

Second Example

Also, there is provided an information processing system including an arrangement unit for transmitting a setting program to a part or the whole of at least one physical server capable of operating one or both of a virtual appliance realizing a predetermined function and a virtual server collaborating with the virtual appliance, and a management unit for communication with the arrangement unit. In this information processing system, the virtual appliance type identifier capable of identifying the type of the virtual appliance and the virtual server identifier capable of identifying the virtual server collaborating with the virtual appliance are transmitted by the management unit to the arrangement unit. In the arrangement unit, upon reception of the virtual appliance type identifier and the virtual server identifier, a virtual appliance setting program for setting the collaboration with the virtual server identifiable by the virtual server identifier is transmitted to the virtual appliance functioning as the result of execution, by the physical server, of the program causing the physical server to function as a virtual appliance identifiable by the virtual appliance type identifier on the one hand, and the virtual server setting program for setting the collaboration with the virtual appliance identifiable by the virtual appliance type identifier is transmitted to the virtual server identifiable by the virtual server identifier on the other hand.

Third Example

Also, there is provided an information processing system including an arrangement unit for transmitting a setting program to a part or the whole of at least one physical server capable of operating a virtual appliance realizing a predetermined function or at least one virtual server collaborating with the virtual appliance, and a management unit for communication with the arrangement unit. This information processing system includes a transmission unit for transmitting, to the arrangement unit, a virtual appliance type identifier capable of identifying the type of a virtual appliance and a virtual server identifier capable of identifying a virtual server collaborating with the virtual appliance. The arrangement unit includes a storage unit for storing, in correspondence with each other, a virtual appliance type identifier, a program causing a physical server to function as a virtual appliance identifiable by the virtual appliance type identifier, a virtual appliance setting program for setting the virtual appliance to realize the function of the virtual appliance identifiable by the virtual appliance type identifier, and a virtual server setting program for setting the virtual server for collaboration with the virtual appliance identifiable by the virtual appliance type identifier. Also, the arrangement unit includes a transmission unit for transmitting a virtual appliance setting program to the virtual appliance functioning as the result of execution, by the physical server, a program causing the physical server to function as a virtual appliance on the one hand and transmitting a virtual server setting program to the virtual server on the other hand. Further, the arrangement unit, upon reception of the virtual appliance type identifier and the virtual server identifier, reads from the storage unit a program causing the physical server to function as a virtual appliance identifiable by the virtual appliance type identifier, a virtual appliance setting program and a virtual server setting program. Also, the arrangement unit includes a management unit in which the program and the virtual appliance setting program are transmitted through the transmission unit on the one hand and the virtual server setting program is transmitted through the transmission unit to the virtual server identifiable by the virtual server identifier on the other hand.

Fourth Example

The storage unit shown in the third example stores, in correspondence with the virtual appliance type identifier, the order information indicating the order in which the virtual appliance is set according to the virtual appliance setting program or the virtual server setting program. The management unit reads the order information from the storage unit and causes the virtual appliance setting program and the virtual server setting program to be executed in the order indicated in the order information thus read.

Fifth Example

The virtual appliance setting program shown in the third or fourth example is executed using the variable information determined according to the virtual server identifier. The management unit determines the variable information based on the virtual server identifier, and causes the transmission unit to transmit the variable information and the virtual appliance setting program.

Sixth Example

In the information processing system described in any one of the third to fifth examples, the virtual server setting program is executed using the second variable information determined according to the virtual appliance type identifier. The management unit determines the second variable information based on the virtual appliance type identifier, and causes the transmission unit to transmit the virtual server setting program and the variable information thus determined.

Seventh Example

The virtual appliance shown in the sixth example is a load balancer, the variable information including the virtual appliance setting program is an IP address, and the virtual server is a Web server. The management unit determines the IP address of the virtual server identifiable by the virtual server identifier and causes the transmission unit to transmit the virtual appliance setting program. Also, the management unit determines the virtual IP address used by the load balancer and causes the transmission unit to transmit the virtual server setting program.

Eighth Example

Also, there is provided a method for controlling an arrangement unit which transmits a setting program to a part or the whole of at least one physical server capable of operating one or both of a virtual appliance realizing a predetermined function and a virtual server collaborating with the virtual appliance. This method includes a step in which the arrangement unit receives the virtual appliance type identifier and the virtual server identifier. Also, this method includes a step in which the virtual appliance setting program for setting the collaboration with the virtual server identifiable by the virtual server identifier is transmitted to a virtual appliance functioning as the result of execution, by the physical server, of a program causing the physical server to function as a virtual appliance identifiable by the virtual appliance type identifier on the one hand, and the virtual server setting program for setting the collaboration with a virtual appliance identifiable by the virtual appliance type identifier is transmitted to a virtual server identifiable by the virtual server identifier on the other hand.

Ninth Example

Also, there is provided a method for controlling an information processing system including an arrangement unit for transmitting a setting program to a part or the whole of at least one physical server capable of operating one or both of a virtual appliance realizing a predetermined function and a virtual server collaborating with the virtual appliance, and a management unit for conducting the communication with the arrangement unit. This method includes a step in which the management unit transmits, to the arrangement unit, the virtual appliance type identifier capable of identifying the type of a virtual appliance and the virtual server identifier capable of identifying a virtual server collaborating with the particular virtual appliance. Also, this method includes a step in which the arrangement unit receives the virtual appliance type identifier and the virtual server identifier. Also, this method includes a step in which the virtual appliance setting program for setting the collaboration with a virtual server identifiable by the virtual server identifier is transmitted by the arrangement unit to a virtual appliance functioning as the result of execution, by a physical server, of the program causing the physical server to function as a virtual appliance identifiable by the virtual appliance type identifier on the one hand, and the virtual server setting program for setting the collaboration with a virtual appliance identifiable by the virtual appliance type identifier is transmitted to a virtual server identifiable by the virtual server identifier on the other hand.

Tenth Example

Also, there is provided a method for controlling an information processing system including an arrangement unit for transmitting a setting program to a part or the whole of at least one physical server capable of operating a virtual appliance realizing a predetermined function and at least one virtual server collaborating with the virtual appliance, and a management unit for conducting the communication with the arrangement unit. This method includes a step in which the management unit transmits, to the arrangement unit, the virtual appliance type identifier capable of identifying the type of a virtual appliance and the virtual server identifier capable of identifying a virtual server collaborating with the particular virtual appliance. Also, this method includes a storage step in which the arrangement unit stores, in correspondence with each other, the virtual appliance type, identifier, the program causing the physical server to function as a virtual appliance identifiable by the virtual appliance type identifier, the virtual appliance setting program for setting the virtual appliance to realize the function of the virtual appliance identifiable by the virtual appliance type identifier, and the virtual server setting program for setting the virtual server for collaboration with the virtual appliance identifiable by the virtual appliance type identifier. Also, this method includes a transmission step in which the arrangement unit transmits the virtual appliance setting program to a virtual appliance functioning as the result of execution, by a physical server, of the program causing the physical server to function as a virtual appliance on the one hand and transmits the virtual server setting program to a virtual server on the other hand. Also, this method includes a step in which the arrangement unit receives the virtual appliance type identifier and the virtual server identifier. Also, this method includes a management step in which the arrangement unit, by accessing the information stored in the storage step, reads the program causing a physical server to function as a virtual appliance identifiable by the virtual appliance type identifier, the virtual appliance setting program and the virtual server setting program, transmits the program and the virtual appliance setting program through the transmission unit, and also transmits the virtual server setting program to a virtual server identifiable by the virtual server identifier.

11th Example

In the storage step shown in the tenth example, the order information indicating the order in which the virtual appliance is set according to the virtual appliance setting program or according to the virtual server setting program is stored in the virtual appliance type identifier in correspondence with each other. In the management, the order information is read from the storage unit, so that the virtual appliance setting program and the virtual server setting program are executed in the order indicated in the order information thus read.

12th Example

The virtual appliance setting program shown in the tenth or 11th example is executed using the variable information determined according to the virtual server identifier, and in the management step, the variable information is determined based on the virtual server identifier while at the same time transmitting the virtual appliance setting program and the variable information thus determined.

13th Example

The virtual server setting program shown in the tenth to 12th examples is executed using the second variable information determined according to the virtual appliance type identifier, and in the management step, the second variable information is determined based on the virtual appliance type identifier while at the same time transmitting the virtual server setting program and the variable information thus determined.

14th Example

The virtual appliance shown in the 13th example is a load balancer, and the variable information including the virtual appliance setting program is an IP address, while the virtual server is a Web server. In the management step, the IP address of the virtual server identifiable by the virtual server identifier is determined and the virtual appliance setting program is transmitted, on the hand, and the virtual IP address used by the load balancer is determined and the virtual server setting program is transmitted on the other hand.

15th Example

Also, there is provided a program causing a computer to function as an arrangement unit for transmitting, for example, a setting program to a part or the whole of at least one physical server capable of operating at least one or both of a virtual appliance realizing a predetermined function and a virtual server collaborating with the virtual appliance. This program is supplied as an input with the virtual appliance type identifier capable of identifying the type of a virtual appliance and the virtual server identifier capable of identifying a virtual server collaborating with the virtual appliance. Then, a computer is caused to execute the process in which the virtual appliance setting program for setting the collaboration with the virtual server identifiable by the virtual server identifier is transmitted to the virtual appliance functioning as the result of execution, by a physical server, of the program causing the physical server to function as a virtual appliance identifiable by the virtual appliance type identifier on the one hand and the virtual server setting program for setting the collaboration with the virtual appliance identifiable by the virtual appliance type identifier is transmitted to the virtual server identifiable by the virtual server identifier on the other hand.

16th Example

Also, there is provided a program causing a computer to function, for example, as an arrangement unit for transmitting a setting program to a part or the whole of at least one physical server capable of operating a virtual appliance realizing a predetermined function and at least one virtual server collaborating with the virtual appliance. This program has a storage process for causing the computer to store, in correspondence with each other, a virtual appliance type identifier capable of identifying the type of a virtual appliance, a program causing a physical server to function as a virtual appliance identifiable by the particular virtual appliance type identifier, a virtual appliance setting program for setting the virtual appliance to realize the function of the virtual appliance identifiable by the virtual appliance type identifier, and a virtual server setting program for setting a virtual server for collaboration with the virtual appliance identifiable by the virtual appliance type identifier. Also, this program includes a transmission process for transmitting the virtual appliance setting program to a virtual appliance functioning as the result of execution, by a physical server, of a program causing the physical server to function as a virtual appliance on the one hand and the virtual server setting program to the virtual server on the other hand. Also, according to this program, the computer is caused to execute the management process in which, upon reception of the virtual appliance type identifier and the virtual server identifier capable of identifying a virtual server collaborating with a virtual appliance, the program causing the physical server to function as a virtual appliance identifiable by the virtual appliance type identifier, the virtual appliance setting program and the virtual server setting program are read from the information stored by the storage process. Also, according to this program, the aforementioned program and the virtual appliance setting program are transmitted by the transmission process on the one hand and the virtual server setting program is transmitted by the transmission process to the virtual server identifiable by the virtual server identifier on the other hand.

17th Example

In the storage process shown in the 16th example, the virtual appliance type identifier stores therein, in correspondence with each other, the order information indicating the order in which the virtual appliance is set according to the virtual appliance setting program or according to the virtual server setting program. Also, according to this program, the management unit is caused to read the order information stored in the storage process and execute the virtual appliance setting program and the virtual server setting program in the order indicated in the order information thus read.

18th Example

The virtual appliance setting program shown in the 16th or 17th example includes the variable information determined according to the virtual server identifier, and the management process determines the variable information based on the virtual server identifier while at the same time transmitting the virtual appliance setting program through the transmission process.

19th Example

The virtual server setting program shown in the 16th to 18th examples includes the second variable information determined according to the virtual appliance type identifier, and the management unit determines the second variable information based on the virtual appliance type identifier while at the same time transmitting the virtual server setting program through the transmission process.

20th Example

In the information processing system shown in the sixth example, the virtual appliance is a load balancer, the variable information including the virtual appliance setting program is an IP address, and the virtual server is a Web server. In the management process, the IP address of the virtual server identifiable by the virtual server identifier is determined, and the virtual appliance setting program is transmitted through the transmission process. Then, the virtual IP address used by the load balancer is determined, and the virtual server setting program is transmitted through the transmission process.

Incidentally, the present invention is not limited to the embodiments described above, but covers modifications and improvements without departing from the scope of the invention to achieve the object of the invention.

The invention claimed is:

1. An information processing apparatus comprising:
   a designation unit that receives a VA (Virtual Appliance) type and a VM (Virtual Machine) identifier designated by a user through a user interface, the VM identifier designated by the user specifying a VM to collaborate with a VA corresponding to the VA type designated by the user, the VA type being indicative of a type of information processing executed by the VA;
   a VA repository that stores a VA type, a VA setting program and a VM setting program in a manner that the VA type, the VA setting program and the VM setting program are associated with each other;
   a setting program management unit that obtains, from the VA repository, the VA setting program and the VM setting program which are associated with the VA type received by the designation unit, and specifies the VA based on the VA type; and
   a setting program transmission unit that transmits the obtained VM setting program and a VA identifier of the specified VA to the VM specified by the VM identifier received by the designation unit, and transmits the obtained VA setting program and the received VM identifier to the VA specified by the VA identifier,
   wherein the information processing apparatus makes the VM execute the VM setting program with the VA identifier as an argument to register the VA identifier in the VM, and makes the VA execute the VA setting program with the VM identifier as an argument to register the VM identifier in the VA, and
   wherein the VA type indicates one of a load balancer and a VPN (Virtual Private Network) server.

2. The information processing apparatus as set forth in claim 1, further comprising an execution order control unit which controls a timing of causing said VA to execute said VA setting program and a timing of causing said VM to execute said VM setting program, and
   wherein said VA repository further stores order information indicating an order in which said VA setting program is executed by said VA and said VM setting program is executed by said VM,
   wherein said management unit reads said order information stored in said VA repository, and
   said execution order control unit causes said VA setting program and said VM setting program to be executed based on the order of execution indicated in said order information read from said VA repository.

3. An information processing system comprising:
   a designation unit that receives a VA (Virtual Appliance) type and a VM (Virtual Machine) identifier designated by a user through a user interface, the VM identifier designated by the user specifying a VM to collaborate with a VA corresponding to the VA type designated by the user, the VA type being indicative of a type of information processing executed by the VA;
   a VA repository that stores a VA type, a VA setting program and a VM setting program in a manner that the VA type, the VA setting program and the VM setting program are associated with each other;
   a setting program management unit that obtains, from the VA repository, the VA setting program and the VM setting program which are associated with the VA type received by the designation unit, and specifies the VA based on the VA type; and
   a setting program transmission unit that transmits the obtained VM setting program and a VA identifier of the specified VA to the VM specified by the VM identifier received by the designation unit, and transmits the obtained VA setting program and the received VM identifier to the VA specified by the VA identifier,
   wherein the information processing apparatus makes the VM execute the VM setting program with the VA identifier as an argument to register the VA identifier in the VM, and makes the VA execute the VA setting program with the VM identifier as an argument to register the VM identifier in the VA, and
   wherein the VA type indicates one of a load balancer and a VPN (Virtual Private Network) server.

4. The information processing system as set forth in claim 3, further comprising an execution order control unit which controls a timing at which said VA executes said VA setting program and a timing at which said VM executes said VM setting program, and
   wherein said VA repository further stores order information indicating an order in which said VA executes said VA setting program and said VM executes said VM setting program,
   wherein said management unit reads said order information stored in said VA repository, and
   said execution order control unit causes said VA setting program and said VM setting program to be executed based on the order of execution indicated in said order information read from said VA repository.

5. The information processing system as set forth in claim 3, further comprising an allocation unit which allocates identification information for identifying virtual machines from each other,
   wherein said allocation unit allocates said identification information to said virtual machines at a predetermined timing.

6. A setting program transmission method comprising:
   a step of receiving a VA (Virtual Appliance) type and a VM (Virtual Machine) identifier designated by a user through a user interface, the VM identifier designated by the user specifying a VM to collaborate with a VA corresponding to the VA type designated by the user, the VA type being indicative of a type of information processing executed by the VA;
   a step of storing a VA type, a VA setting program and a VM setting program in a manner that the VA type, the VA setting program and the VM setting program are associated with each other;
   a step of obtaining the VA setting program and the VM setting program which are associated with the received VA type, and specifying the VA based on the VA type;
   a step of transmitting the obtained VM setting program and a VA identifier of the specified VA to the VM specified by the received VM identifier, and transmitting the obtained VA setting program and the received VM identifier to the VA specified by the VA identifier,
   wherein the method further comprises making the VM execute the VM setting program with the VA identifier as an argument to register the VA identifier in the VM, and making the VA execute the VA setting program with the VM identifier as an argument to register the VM identifier in the VA, and wherein the VA type indicates one of a load balancer and a VPN (Virtual Private Network) server.

7. A non-transitory computer readable storage medium that stores a server setting program causing an information processing apparatus to execute:

a process of receiving a VA (Virtual Appliance) type and a VM (Virtual Machine) identifier designated by a user through a user interface, the VM identifier designated by a user specifying a VM to collaborate with a VA corresponding to the VA type designated by the user, the VA type being indicative of a type of information processing executed by the VA;

a process of storing a VA type, a VA setting program and a VM setting program in a manner that the VA type, the VA setting program and the VM setting program are associated with each other;

a process of obtaining the VA setting program and the VM setting program which are associated with the received VA type, and specifying the VA based on the VA type;

a process of transmitting the obtained VM setting program and a VA identifier of the specified VA to the VM specified by the received VM identifier, and transmitting the obtained VA setting program and the received VM identifier to the VA specified by the VA identifier, wherein the program causes the information processing apparatus to execute a process of making the VM execute the VM setting program with the VA identifier as an argument to register the VA identifier in the VM, and making the VA execute the VA setting program with the VM identifier as an argument to register the VM identifier in the VA, and wherein the VA type indicates one of a load balancer and a VPN (Virtual Private Network) server.

* * * * *